(12) United States Patent
Lee et al.

(10) Patent No.: US 10,508,159 B2
(45) Date of Patent: Dec. 17, 2019

(54) METHOD FOR PREPARING DIENE-BASED RUBBER LATEX AND ACRYLONITRILE-BUTADIENE-STYRENE GRAFT COPOLYMER COMPRISING THE SAME

(71) Applicant: LG CHEM, LTD., Seoul (KR)

(72) Inventors: Jin Hyoung Lee, Daejeon (KR); Young Min Kim, Daejeon (KR); Su Jeong Han, Daejeon (KR); Yoo Vin Kim, Daejeon (KR); Young Hwan Jeong, Daejeon (KR); Sun Haeng Chung, Daejeon (KR); Jae Min Suk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 233 days.

(21) Appl. No.: 15/519,111

(22) PCT Filed: Dec. 24, 2015

(86) PCT No.: PCT/KR2015/014285
§ 371 (c)(1),
(2) Date: Apr. 13, 2017

(87) PCT Pub. No.: WO2016/105171
PCT Pub. Date: Jun. 30, 2016

(65) Prior Publication Data
US 2017/0226236 A1 Aug. 10, 2017

(30) Foreign Application Priority Data

Dec. 24, 2014 (KR) .................. 10-2014-0187763
Dec. 24, 2015 (KR) .................. 10-2015-0186080

(51) Int. Cl.
| | |
|---|---|
| *C08F 2/44* | (2006.01) |
| *C08F 2/24* | (2006.01) |
| *A41D 19/00* | (2006.01) |
| *C08F 279/02* | (2006.01) |
| *C08K 5/00* | (2006.01) |
| *C08L 55/02* | (2006.01) |
| *C08F 36/06* | (2006.01) |

(52) U.S. Cl.
CPC ............ *C08F 2/44* (2013.01); *A41D 19/0055* (2013.01); *C08F 2/24* (2013.01); *C08F 36/06* (2013.01); *C08F 279/02* (2013.01); *C08K 5/0025* (2013.01); *C08L 55/02* (2013.01); *C08L 2205/02* (2013.01)

(58) Field of Classification Search
CPC ..................... C08F 2/24; C08F 2/44
See application file for complete search history.

(56) References Cited

U.S. PATENT DOCUMENTS

| | | | |
|---|---|---|---|
| 3,600,465 | A | 8/1971 | Knapp et al. |
| 2004/0192843 | A1 | 9/2004 | Chai et al. |
| 2009/0076205 | A1 | 3/2009 | Huang et al. |

FOREIGN PATENT DOCUMENTS

| | | |
|---|---|---|
| CN | 101033267 A | 9/2007 |
| CN | 101125906 A | 2/2008 |
| JP | S49-005732 B | 2/1974 |
| JP | S54-133588 A | 10/1979 |
| JP | H06-049147 A | 2/1994 |
| JP | 2005-509702 A | 4/2005 |
| KR | 10-1992-0005670 B1 | 7/1992 |
| KR | 10-1995-0009734 B1 | 8/1995 |
| KR | 10-1995-0011450 A1 | 10/1995 |
| KR | 10-0871318 B1 | 12/2008 |
| KR | 10-2011-0065019 A | 6/2011 |
| KR | 10-1233587 B1 | 2/2013 |
| KR | 10-2013-0057139 A | 5/2013 |

OTHER PUBLICATIONS

Machine translation of KR 2011-065019 A, published Jun. 15, 2011. (Year: 2011).*
Machine translation of KR 2010-038611 A, published Apr. 15, 2010. (Year: 2010).*
Extended European Search Report for European Application No. 15873698.3 dated Dec. 1, 2017.
"XP002775881" Database WPI Week 201216, 2017, Thompson Scientific, London, GB.
"XP002775882" Database WPI Week 201381, 2017, Thomson Scientific, London, GB.
"XP002775883" Database WPI Week 200878, 2017, Thomson Scientific, London, GB.
"XP002775884" Database WPI Week 200921, 2017, Thomson Scientific, London, GB.
International Search Report for PCT/KR2015/014285 filed on Dec. 24, 2015.

* cited by examiner

*Primary Examiner* — Vickey Nerangis

(57) ABSTRACT

The present invention relates to a method for preparing large-sized diene-based rubber latex, and an acrylonitrile-butadiene-styrene graft copolymer comprising the same. More particularly, it relates to a method for preparing large-sized diene-based rubber latex having improved impact strength by controlling content and time of addition of a cross-linking agent and an emulsifier having critical micelle concentration (CMC) of 150 mg/L or less during preparation of the large-sized rubber latex, large-sized diene-based rubber latex prepared therefrom, and an acrylonitrile-butadiene-styrene graft copolymer and thermoplastic resin comprising the same.

15 Claims, No Drawings ized diene-based rubber latex, and an acrylonitrile-butadiene-styrene graft copolymer comprising the same. More particularly, it relates to a method for preparing large-sized diene-based rubber latex having improved impact strength by controlling content and time of addition of a cross-linking agent and an emulsifier having critical micelle concentration (CMC) of 150 mg/L or less during preparation of the large-sized rubber latex, large-sized diene-based rubber latex prepared therefrom, and an acrylonitrile-butadiene-styrene graft copolymer and thermoplastic resin comprising the same.

METHOD FOR PREPARING DIENE-BASED RUBBER LATEX AND ACRYLONITRILE-BUTADIENE-STYRENE GRAFT COPOLYMER COMPRISING THE SAME

CROSS-REFERENCE TO RELATED APPLICATION

This application is a U.S. National Stage of PCT/KR2015/014285 filed Dec. 24, 2015, which claims priority of Korean Patent Application No. 10-2014-0187763, filed on Dec. 24, 2014, and Korean Patent Application No. 10-2015-0186080, filed on Dec. 24, 2015, in the Korean Intellectual Property Office, which are hereby incorporated by reference in their entirety.

TECHNICAL FIELD

The present invention relates to a method for preparing large-sized diene-based rubber latex, and an acrylonitrile-butadiene-styrene graft copolymer comprising the same. More particularly, it relates to a method for preparing large-sized diene-based rubber latex having improved impact strength by controlling content and time of addition of a cross-linking agent and an emulsifier having critical micelle concentration (CMC) of 150 mg/L or less during preparation of the large-sized rubber latex, large-sized diene-based rubber latex prepared therefrom, and an acrylonitrile-butadiene-styrene graft copolymer and thermoplastic resin comprising the same.

BACKGROUND ART

In general, thermoplastic resin is widely used to electricity, electronic parts, office machines, car parts and the like due to its relatively good properties such as impact resistance, mechanical strength, moldability, gloss and the like.

As a representative thermoplastic resin, Acrylonitrile-Butadiene-Styrene (ABS) resin is an impact reinforcing agent, and comprises a conjugated diene-based rubber latex, which is a representative polybutadiene having excellent rubber characteristics, as a main ingredient.

The conjugated diene-based rubber latex can be prepared by emulsion polymerization. The emulsion polymerization has advantages that it is easy to modify recipe according to quality level preferentially required and it can prepare various product families when extruding a product produced in the powder form and then mixing thereof with various matrix resins (PSAN, PC, PBT, PVC and the like) and additives (flame retardant, weather resistant stabilizer, antistatic agent, antibiotic and the like).

Meanwhile, particle diameter of the conjugated diene-based rubber latex is closely related to reaction time of the emulsion polymerization. For example, now, the emulsion polymerization reaction should be conducted for 30 hours or longer to prepare large-sized rubber latex having large particle diameter. Thus, there is a disadvantage that the conventional method for preparing the large-sized rubber latex has low productivity.

In order to improve these problems, methods of adding a small amount of additives such as an emulsifier and a vinyl cyanide monomer before starting polymerization or continuously adding the emulsifier are suggested. However, there is a problem that reaction time reduction effect is inadequate. If increasing polymerization reaction temperature to increase reaction speed, rather particle diameter of the rubber latex is reduced and reaction coagulation is increased, and also it causes another problem that reaction pressure is increased by excess reaction heat thereby safety is low during mass production process.

Moreover, when preparing the thermoplastic resin, in the case of mixing the large-sized rubber latex and the small-sized rubber latex prepared by the conventional method, the thermoplastic resin having relatively high low-temperature impact strength and relatively high surface gloss at the same time can be prepared, but there are disadvantages of longer processing time, complex processing process and high cost because the method comprises a process of preparing the large-sized rubber latex and the small-sized rubber latex, respectively, and then mixing thereof.

Accordingly, development of a method for preparing diene-based rubber latex whose particle diameter size is controlled in a short reaction time is urgent.

DISCLOSURE OF THE INVENTION

Technical Problem

In order to solve the above problems, one object of the present invention is to provide a method for preparing diene-based rubber latex, wherein content ratio of large-sized rubber latex and small-sized rubber latex is controlled by adjusting content and time of addition of a cross-linking agent and an emulsifier having critical micelle concentration (CMC) of 150 mg/L or less.

Another object of the present invention is to provide diene-based rubber latex prepared from the method.

Further another object of the present invention is to provide an acrylonitrile-butadiene-styrene graft copolymer having improved impact strength, gloss and low-temperature impact strength by comprising the diene-based rubber latex, and thermoplastic resin comprising the same.

Technical Solution

In order to accomplish the objects described above, one embodiment of the present invention provides a method for preparing diene-based rubber latex comprising:

a step of adding a conjugated diene-based monomer 60 parts by weight to 75 parts by weight, a first emulsifier 1 part by weight to 3 parts by weight, a polymerization initiator 0.2 part by weight to 0.4 part by weight, an electrolyte 0.2 part by weight to 3 parts by weight, a molecular weight control agent 0.1 part by weight to 0.5 part by weight and ion exchanged water 65 parts by weight to 100 parts by weight into a reactor and then polymerizing thereof (Step 1);

a step of adding the conjugated diene-based monomer 10 parts by weight to 20 parts by weight and a second emulsifier 0.1 part by weight to 1.0 part by weight simultaneously at the time point that the polymerization conversion rate of the polymerization reaction is 30% to 40% and then polymerizing thereof (Step 2);

a step of adding a residual amount of the conjugated diene-based monomer and optionally a third emulsifier 0 part by weight to 1 part by weight simultaneously or continuously at the time point that the polymerization conversion rate of the polymerization reaction is 60% to 70% and then polymerizing thereof (Step 3); and a step of completing polymerization by adding a polymerization inhibitor at the time point that the polymerization conversion rate of the polymerization reaction is 92% or higher (Step 4), which further comprises a step of additionally adding a cross-linking agent 0.05 part by weight to 0.3 part by weight at the time point that the polymerization conversion rate of the polymerization reaction progressed through the step 1 and the step 2 is 0% to 50%.

Further, the method may further comprise a step of adding a fourth emulsifier having critical micelle concentration (CMC) of 150 mg/L or less 0.01 part by weight to 0.5 part by weight at the time point that the polymerization conversion rate of the polymerization reaction progressed through the step 1 and the step 2 is 50% to 85%.

In the case, the cross-linking agent may comprise an acrylate-based cross-linking agent, and the fourth emulsifier may comprise an emulsifier having CMC of 10 mg/L or less or an emulsifier having CMC of 10 mg/L to 150 mg/L.

Further, one embodiment of the present invention provides the diene-based rubber latex prepared by the preparation method, which comprises large-sized diene-based rubber latex having average particle diameter of 2,600 Å to 5,000 Å and small-sized of diene-based rubber latex having average particle diameter of 20 nm to 70 nm, and mixing ratio of the large-sized rubber latex and the small-sized rubber latex (large-sized rubber latex:small-sized rubber latex) is 98 wt %:2 wt % to 99.9 wt %:0.01 wt %.

Further, the present invention provides an acrylonitrile-butadiene-styrene graft copolymer comprising the diene-based rubber latex.

Further, the present invention provides thermoplastic resin comprising the acrylonitrile-butadiene-styrene graft copolymer.

Advantageous Effects

The method for preparing diene-based rubber latex according to the present invention can prepare diene-based rubber latex comprising large-sized rubber latex and small-sized rubber latex at the same time by conducting polymerization reaction wherein a cross-linking agent is added at the time point of the polymerization conversion rate of 0% to 50%, and an emulsifier having critical micelle concentration (CMC) of 150 mg/L or less is additionally added at the time point of the polymerization conversion rate of 50% to 85%.

Further, by comprising the same, surface gloss and low-temperature impact strength of an acrylonitrile-butadiene-styrene graft copolymer and thermoplastic resin can be secured.

Thus, the method for preparing diene-based rubber latex according to the present invention and the acrylonitrile-butadiene-styrene graft copolymer and the thermoplastic resin comprising the diene-based rubber latex prepared from the method can be easily applied to industries requiring them, in particular, an industry of an impact reinforcing agent.

BEST MODE FOR CARRYING OUT THE INVENTION

Hereinafter, the present invention will be described in more detail in order to help the understanding of the present invention.

In this case, it should be understood that the terms or words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

One embodiment of the present invention provides a method for preparing diene-based rubber latex comprising:

a step of adding a conjugated diene-based monomer 60 parts by weight to 75 parts by weight, a first emulsifier 1 part by weight to 3 parts by weight, a polymerization initiator 0.2 part by weight to 0.4 part by weight, an electrolyte 0.2 part by weight to 3 parts by weight, a molecular weight control agent 0.1 part by weight to 0.5 part by weight and ion exchanged water 65 parts by weight to 100 parts by weight into a reactor and then polymerizing thereof (Step 1);

a step of adding the conjugated diene-based monomer 10 parts by weight to 20 parts by weight and a second emulsifier 0.1 part by weight to 1.0 part by weight simultaneously at the time point that the polymerization conversion rate of the polymerization reaction is 30% to 40% and then polymerizing thereof (Step 2);

a step of adding a residual amount of the conjugated diene-based monomer and optionally a third emulsifier 0 part by weight to 1 part by weight simultaneously or continuously at the time point that the polymerization conversion rate of the polymerization reaction is 60% to 70% and then polymerizing thereof (Step 3); and a step of completing polymerization by adding a polymerization inhibitor at the time point that the polymerization conversion rate of the polymerization reaction is 92% or higher (Step 4), which further comprises a step of additionally adding a cross-linking agent 0.05 part by weight to 0.3 part by weight at the time point that the polymerization conversion rate of the polymerization reaction progressed through the step 1 and the step 2 is 0% to 50%.

Further, the present invention provides a method for preparing diene-based rubber latex, which further comprises a step of additionally adding a fourth emulsifier having critical micelle concentration (CMC) of 150 mg/L or less 0.01 part by weight to 0.5 part by weight at the time point that the polymerization conversion rate of the polymerization reaction progressed through the step 1 and the step 2 is 50% to 85%.

The step 1 of the polymerization is a step of adding the conjugated diene-based monomer 60 parts by weight to 75 parts by weight, the first emulsifier 1 part by weight to 3 parts by weight, the polymerization initiator 0.2 part by weight to 0.4 part by weight, the electrolyte 0.2 part by weight to 3 parts by weight, the molecular weight control agent 0.1 part by weight to 0.5 part by weight and the ion exchanged water 65 parts by weight to 100 parts by weight into the reactor in order to mix the conjugated diene-based monomer, the first emulsifier, the molecular weight control agent and the like and to initiate polymerization.

In the present invention, the conjugated diene-based monomer may comprise a single material of a conjugated diene-based monomer, or a monomer mixture comprising the conjugated diene-based monomer as a main ingredient.

In the case, the monomer mixture may comprise the conjugated diene-based monomer 55 wt % to 99.7 wt %; the aromatic vinyl-based monomer 0.1 wt % to 40 wt %; and the vinyl cyanide-based monomer 0.1 wt % to 40 wt %.

The conjugated diene-based monomer is not particularly limited, and for example, it may be at least one selected from the group consisting of 1,3-butadiene, isoprene, chloroprene and piperylene. Specifically, it may be 1,3-butadiene.

The aromatic vinyl-based monomer is not particularly limited, and for example, it may be at least one selected from the group consisting of styrene, α-methyl styrene, α-ethyl styrene and p-methyl styrene. Specifically, it may be styrene.

The vinyl cyanide-based monomer is not particularly limited, and for example, it may be at least one selected from the group consisting of acrylonitrile, methacrylonitrile and ethacrylonitrile. Specifically, it may be acrylonitrile.

The polymerization initiator may be a common polymerization initiator known in the art without particular limitation, and for example, it may be a water-soluble polymerization initiator such as persulfate, a lipid-soluble polymerization initiator such as a peroxide compound, an oxidation-reduction catalyst and the like.

The persulfate may be potassium persulfate, sodium persulfate, ammonium persulfate and the like, and the lipid-soluble polymerization initiator may be cumene hydroperoxide, diisopropyl benzene hydroperoxide, azobis isobutylnitrile, tertiary butyl hydroperoxide, paramethane hydroperoxide, benzoylperoxide and the like. Further, the oxidation-reduction catalyst may be sodium formaldehyde sulfoxylate, sodium ethylenediamine tetraacetate, ferrous sulfate, dextrose, sodium pyrophosphate, sodium sulfite and the like.

The electrolyte may be $KCl$, $NaCl$, $KHCO_3$, $NaHCO_3$, $K_2CO_3$, $Na_2CO_3$, $K_2SO_4$, $Na_2SO_4$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and the like.

The molecular weight control agent is not particularly limited, and for example, it may be mercaptans such as a-methyl styrene dimer, t-dodecyl mercaptan, n-dodecyl mercaptan and octyl mercaptan, halogenated hydrocarbon such as carbon tetrachoride, methylene chloride and methylene bromide, and sulfur-containing compounds such as tetraethyl thiuram disulfide, dipentamethylene thiuram disulfide and diisopropylxanthogen disulfide. Preferably, it may be t-dodecyl mercaptan.

Further, the step 2 of the polymerization is a step of adding the conjugated diene-based monomer 10 parts by weight to 20 parts by weight and the second emulsifier 0.1 part by weight to 1.0 part by weight simultaneously at the time point that the polymerization conversion rate of the first polymerization is 30% to 40%.

The step 3 of the polymerization is a step of adding the residual amount of the conjugated diene-based monomer and optionally the third emulsifier 0 part by weight to 1 part by weight simultaneously or continuously at the time point that the polymerization conversion rate of the first polymerization is 60% to 70%.

In this case, the first to the third emulsifiers are each independently allyl aryl sulfonate, alkali methyl alkyl sulfate, sulfonated alkyl ester, fatty acid soap, rosin acid alkali salt, sodium lauryl sulfonate, potassium oleate, sodium alkylbenzene sulfonate, polyoxyethylene alkylphenyl ether, sodium dodecyl allyl sulfosuccinate, $C_{16-18}$ alkenyl dipotassium succinate, sodium acrylamido stearate, polyoxyethylene alkyl phenyl ether ammonium sulfate, polyoxyethylene alkyl ether ester ammonium salt and the like may be used alone or in combination, but not limited thereto.

As mentioned above, the preparation method according to the present invention can easily form the diene-based rubber polymer having proper particle diameter by adding the conjugated diene-based monomer in three steps (simultaneous addition and continuous addition) according to the time point of the polymer conversion rate.

The polymerization steps 1 to 3 according to the present invention may be conducted under different temperature conditions, respectively.

Specifically, the step 1 may be conducted under a temperature condition of 65° C. to 70° C., the step 2 may be conducted under a temperature condition of 72° C. to 75° C., and the step 3 may be conducted under a temperature condition of 80° C. to 85° C. Namely, in the present invention, the polymerization may be conducted by gradually increasing the temperature condition as the polymerization progresses.

In particular, the method of the present invention may comprise a step of additionally adding a cross-linking agent 0.05 part by weight to 0.3 part by weight when the polymer conversion rate of the first polymerization reaction reaches 0% to 50%.

In this case, representative examples of the cross-linking agent may be (alkylene glycol)$_n$ diacrylate or (alkylene glycol)$_n$ triacrylate (wherein, n is an integer between 3 and 15). In this case, if the n is greater than 15, impact strength may be improved, but there may be a disadvantage of deterioration of rubber latex stability.

Further, if the content of the cross-linking agent is 0.05 part by weight or less, impact strength improving effect may be not large or little, and if it is more than 0.3 part by weight, there is a defect of deterioration of rubber latex stability.

Specifically, the cross-linking agent may be (ethylene glycol)$_8$ diacrylate, (ethylene glycol)$_{12}$ diacrylate, (propylene glycol)$_8$ diacrylate or (propylene glycol)$_{12}$ diacrylate.

In particular, in the present invention, an effect on increasing polymerization speed can be obtained by adding the acrylate-based cross-linking agent at the beginning of the polymerization reaction and then reacting thereof.

Further, the method of the present invention may comprise a step of additionally adding the fourth emulsifier having critical micelle concentration (CMC) of 150 mg/L or less 0.01 part by weight to 0.5 part by weight at the time point that the polymerization conversion rate of the polymerization reaction progressed through the step 1 and the step 2 is 50% to 85%.

Specifically, the fourth emulsifier may comprise an emulsifier having CMC 10 mg/L or less or an emulsifier having CMC of 10 mg/L to 150 mg/L.

More specifically, in the case of comprising the emulsifier having CMC of 10 mg/L or less, the emulsifier having CMC of 10 mg/L or less 0.01 part by weight to 0.3 part by weight can be added at the time point that the polymerization conversion rate of the polymerization reaction progressed through the step 1 and the step 2 is 60% to 85%. In this case, a representative example of the emulsifier having CMC of 10 mg/L or less may be $C_{16-18}$ alkenyl dipotassium succinate, polyoxyethylene alkylphenyl ether, polyoxyethylene alkylphenyl ether ammonium sulfate and the like.

Further, in the case that the fourth emulsifier comprises the emulsifier having CMC of 10 mg/L to 150 mg/L, the emulsifier having CMC of 10 mg/L to 150 mg/L 0.05 part by weight to 0.5 part by weight can be added at the time point that the polymerization conversion rate of the polymerization reaction progressed through the step 1 and the step 2 is 50% to 85%. In this case, a representative example of the emulsifier having CMC of 10 mg/L to 150 mg/L may be fatty acid soap or potassium oleate and the like, and specifically, it may be potassium oleate.

The first emulsifier to the fourth emulsifier may be all the same, or each independently different. For example, in the case that all of the first emulsifier and the fourth emulsifier comprise potassium oleate, as the first emulsifier added at the beginning of the reaction, the potassium oleate is added together with the electrolyte to form initial micelle or particle, and its role is different from that of the fourth emulsifier, which is added in the middle of the reaction and forms the small-sized rubber latex particle regardless of the initially grown rubber particle.

Namely, in the present invention, the fourth emulsifier is added in the middle of the polymerization reaction to form the large-sized rubber latex and the small-sized rubber latex at the same time. Thus, the present invention can prepare the thermoplastic resin, which can secure high surface gloss and small width of low temperature impact strength reduction while maintaining impact strength equal or higher than before.

Meanwhile, the fourth emulsifier can be added in an amount of about 0.01 part by weight to 0.5 part by weight. If the fourth emulsifier content is greater than 0.5 part by weight while conducting the entire polymerization reaction, width of low-temperature impact strength reduction and high gloss can be secured, but small-sized production rate is increased. Thus, there are disadvantages that deterioration of properties, for example, reduction of impact strength occurs, compared to before, as average particle diameter size is reduced, and reaction stability is deteriorated due to viscosity increase during polymerization process. Further, if the adding content is less than 0.01 part by weight, there are disadvantages that the small-sized production rate may be insignificant, or it is difficult to express effects because the emulsifier is used to stabilize diameter of the preexisting particle.

Moreover, if the conversion rate at the time of addition is low when adding the fourth emulsifier, for example, adding the fourth emulsifier at the time point of the polymerization conversion rate of 50% or lower, it is hard to expect high gloss and small width of low temperature impact strength reduction due to increased small-sized rubber latex production rate. Further, if the conversion rate at the time of addition is high when adding the fourth emulsifier, for example, adding the fourth emulsifier at the time point of the polymerization conversion rate of 80% or higher, there is a disadvantage of showing similar tendency with the case using small amount of the emulsifier because the monomer content not involved in the reaction is low.

Meanwhile, if the emulsifier having high CMC, e.g., 150 mg/L or more as the fourth emulsifier is contained, it is hard to prepare the large-sized rubber latex and the small-sized rubber latex at the same time.

The step of completing polymerization is a step of completing the polymerization at the time point of the polymerization conversion rate of 92% or higher to obtain the diene-based rubber latex.

The step of completing the polymerization may be conducted by using a polymerization inhibitor, and the polymerization inhibitor may be a common polymerization inhibitor known in the art.

Further, the present invention provides diene-based rubber latex prepared by the preparation method.

In this case, the diene-based rubber latex according to one embodiment of the present invention includes large-sized diene-based rubber latex having average particle diameter of 2,600 Å to 5,000 Å and small-sized diene-based rubber latex having average particle diameter of 20 nm to 70 nm, and mixing ratio of the large-sized rubber latex and the small-sized rubber latex (large-sized rubber latex:small-sized rubber latex) may be 98 wt % to 99.9 wt %:0.01 wt % to 2 wt %.

Herein, the Å is a unit of length used to represent wavelength of an electromagnetic radiation, and 1 Å is equal to 0.1 nm.

Further, the diene-based rubber latex may have gel content of 70% to 84%, and swelling index of 11 to 25.

In this case, the gel content represents degree of cross-link in a polymer, i.e., degree of cross-linking of a polymer, and as the gel content value is larger, the degree of cross-linking of a polymer may be higher.

The swelling index represents degree of swelling of a polymer by a solvent, and as the degree of cross-linking of a polymer is higher, the swelling index may be lower.

As mentioned above, the method of the present invention may bring property change in the thermoplastic resin by additionally adding the cross-linking agent 0.05 part by weight to 0.3 part by weight at the time point that the polymerization conversion rate of the polymerization reaction progressed through the step 1 and the step 2 is 0% to 50%, and adding the emulsifier having CMC of 150 mg/L or less about 0.01 part by weight to 0.5 part by weight at the time point that the polymerization conversion rate of the polymerization reaction is 50% to 85%. Namely, because the large-sized rubber latex and the small-sized rubber latex are prepared at the same time, it can inhibit increase of gel content and decrease of swelling index while increasing the polymerization conversion rate. Accordingly, consequently, the thermoplastic resin having improved low-temperature impact strength and surface gloss while maintaining the preexisting impact strength can be prepared. Meanwhile, the small-sized latex can be slightly observed on the rubber latex by TEM analysis images or particle diameter measuring devices, but there is very little difference on average particle diameter and the like.

Moreover, the present invention provides an acrylonitrile-butadiene-styrene copolymer comprising the diene-based rubber latex.

The acrylonitrile-butadiene-styrene copolymer according to one embodiment of the present invention is characterized by comprising:

the diene-based rubber latex 40 wt % to 70 wt %,
the aromatic vinyl compound 20 wt % to 50 wt %, and
the vinyl cyanide compound 10 wt % to 40 wt %.

Specifically, the acrylonitrile-butadiene-styrene copolymer may have polymerization graft rate of 25% to 35%, and formed coagulation content of 0.01% to 0.1%, and more specifically, the copolymer may have the graft rate of 33%, and the formed coagulation content of 0.05%.

On the other hand, according to the present invention, the acrylonitrile-butadiene-styrene copolymer can be prepared by a common method known in the art without particular limitation, and for example, it may be prepared by adding additives such as the aromatic vinyl compound, the vinyl cyanide compound and the emulsifier to the diene-based rubber latex, subjecting thereof to emulsion polymerization, and then coagulating and washing thereof. In this case, each of components can be involved in the reaction by a method of adding the components into the reactor simultaneously, a method of continuously adding thereof or a method of firstly adding a part of the components and then adding the rest of them after initiating polymerization.

Further, in order to easily achieving the emulsion polymerization, as occasion demands, an additive such as a chelating agent, a dispersing agent, a pH adjusting agent, an oxygen absorber, a particle diameter modifier, an antioxidant and an oxygen scavenger can be additionally added, and the emulsion polymerization may be commonly conducted at a temperature range from 10° C. to 90° C., and preferably at a temperature range from 25° C. to 75° C.

Further, the coagulation is to form acrylonitrile-butadiene-styrene copolymer latex coagulation by coagulating the acrylonitrile-butadiene-styrene copolymer latex composition formed after the emulsion polymerization, and it can be conducted by a common method known in the art, for example by treating aqueous base solution or aqueous acid solution to the composition and then subjecting thereof to base coagulation or acid coagulation.

The washing is to obtain the acrylonitrile-butadiene-styrene copolymer by removing impurities (residual emulsifier, coagulating agent and the like) from the acrylonitrile-butadiene-styrene copolymer latex coagulation formed by the base coagulation or the acid coagulation, and it may be conducted by adding the coagulation to aqueous inorganic salt solution and then washing and drying thereof.

In this case, the washing and the drying may be conducted by a common method known in the art without particular limitation.

MODE FOR CARRYING OUT THE INVENTION

Hereinafter, the present invention will be described in more detail, according to the following Examples and Test Examples. However, the following Examples and Test Examples are merely presented to exemplify the present invention, and the scope of the present invention is not limited thereto.

EXAMPLE

Example 1

1) Preparation of Diene-Based Rubber Latex

Ion exchanged water 65 parts by weight, as a monomer, 1,3-butadiene 70 parts by weight, as the first emulsifier, potassium rosinate 1.5 parts by weight and potassium oleate 0.8 part by weight, as an electrolyte, potassium carbonate ($K_2CO_3$) 0.8 part by weight, as a molecular weight control agent, tertiary dodecyl mercaptan (TDDM) 0.3 part by weight, and as a polymerization initiator, potassium persulfate ($K_2S_2O_8$) 0.3 part by weight were added into a nitrogen-substituted polymerization reactor (Autoclave) simultaneously, and then reacted at 70° C. until polymerization conversion rate reached 30% (Step 1). Then, 1,3-butadiene 20 parts by weight was added simultaneously, as the second emulsifier, potassium rosinate 0.3 part by weight was added thereinto, and then reacted at 75° C. until the polymerization conversion rate reached 60% (Step 2). At this time, as shown in the following Table 1, at the beginning of the polymerization reaction, as a cross-linking agent, (propylene glycol)$_8$ diacrylate 0.1 part by weight was added, and when the polymerization conversion rate reached 60%, as the fourth emulsifier, 35 mg/L potassium oleate 0.35 part by weight was additionally added thereinto followed by reacting thereof. Then, the remained 1,3-butadiene 15 parts by weight was added thereinto simultaneously, heated to 82° C. and then reacted (Step 3). Then, the reaction was completed by adding a polymerization inhibitor when the polymerization conversion rate reached 95% or higher to obtain diene-based rubber latex.

2) Preparation of Acrylonitrile-Butadiene-Styrene Copolymer

The diene-based rubber latex prepared in the above 1) 65 parts by weight and ion exchanged 100 parts by weight were added to a nitrogen-substituted polymerization reactor, a mixed solution consisting of acrylonitrile 10 parts by weight, styrene 25 parts by weight, ion exchanged water 20 parts by weight, t-butyl hydroperoxide 0.1 part by weight, potassium rosinate 1.0 part by weight and tertiary dodecyl mercaptan 0.3 part by weight, which was mixed in a separate blending apparatus, was continuously added into the polymerization reactor at 70° C. for 3 hours with dextrose 0.054 part by weight, sodium pyrophosphate 0.004 part by weight and ferrous sulfate 0.002 part by weight. After completing the continuous addition, dextrose 0.05 part by weight, sodium pyrophosphate 0.03 part by weight, ferrous sulfate 0.001 part by weight and t-butyl hydroperoxide 0.005 part by weight were added into the polymerization reactor simultaneously, the temperature was raised for 1 hour up to 80° C., and then the reaction was completed. The formed acrylonitrile-butadiene-styrene copolymer latex was coagulated with aqueous sulfuric acid, washed and then dried to obtain an acrylonitrile-butadiene-styrene copolymer powder.

3) Acrylonitrile-Butadiene-Styrene-Based Thermoplastic Resin

The acrylonitrile-butadiene-styrene graft copolymer powder 26 wt % and styrene-acrylonitrile-based resin (LG SAN 92 HR) 74 wt % were mixed and pelleted using an extruder, and a specimen of acrylonitrile-butadiene-styrene-based thermoplastic resin was obtained by using an injection molding machine.

Example 2

The procedure of Example 1 was repeated except for adding (propylene glycol)$_8$ diacrylate as a cross-linking agent 0.2 part by weight, and adding 35 mg/L potassium oleate as the fourth emulsifier when the polymerization conversion rate reached 58% during preparation of diene-based rubber latex to obtain diene-based rubber latex. Further, an acrylonitrile-butadiene-styrene copolymer and a specimen of thermoplastic resin comprising the same were obtained.

Example 3

The procedure of Example 1 was repeated except for adding (propylene glycol)$_{12}$ diacrylate as a cross-linking agent, and adding 35 mg/L potassium oleate as the fourth emulsifier when the polymerization conversion rate reached 62% during preparation of diene-based rubber latex to obtain diene-based rubber latex. Further, an acrylonitrile-butadiene-styrene copolymer and a specimen of thermoplastic resin comprising the same were obtained.

Example 4

The procedure of Example 1 was repeated except for adding (propylene glycol)$_{12}$ diacrylate as a cross-linking agent when the polymerization conversion rate reached 20%, and adding 35 mg/L potassium oleate as the fourth emulsifier when the polymerization conversion rate reached 58% during preparation of diene-based rubber latex to obtain diene-based rubber latex. Further, an acrylonitrile-butadiene-styrene copolymer and a specimen of thermoplastic resin comprising the same were obtained.

Example 5

The procedure of Example 1 was repeated except for adding $C_{16-18}$ alkenyl dipotassium succinate (Latemul ASK) having CMC of 4.8 mg/L as the fourth emulsifier 0.05 part by weight during preparation of diene-based rubber latex to obtain diene-based rubber latex. Further, an acrylonitrilebutadiene-styrene copolymer and a specimen of thermoplastic resin comprising the same were obtained.

Comparative Example 1

The procedure of Example 1 was repeated except for not additionally adding the cross-linking agent and the fourth emulsifier during preparation of diene-based rubber latex to obtain diene-based rubber latex. Further, an acrylonitrile-butadiene-styrene copolymer and a specimen of thermoplastic resin comprising the same were obtained.

Comparative Example 2

The procedure of Example 1 was repeated except for additionally adding 35 mg/L potassium oleate as the fourth emulsifier 0.35 part by weight when the polymerization conversion rate reached 62% during preparation of diene-based rubber latex to obtain diene-based rubber latex. Further, an acrylonitrile-butadiene-styrene copolymer and a specimen of thermoplastic resin comprising the same were obtained.

Comparative Example 3

The procedure of Example 1 was repeated except for adding (propylene glycol)$_{12}$ diacrylate as a cross-linking agent 0.5 part by weight at the beginning of the reaction, and additionally adding potassium oleate as the fourth emulsifier 0.35 part by weight when the polymerization conversion rate reached 59% during preparation of diene-based rubber latex to obtain diene-based rubber latex. Further, an acrylonitrile-butadiene-styrene copolymer and a specimen of thermoplastic resin comprising the same were obtained.

Comparative Example 4

The procedure of Example 1 was repeated except for adding (propylene glycol)$_{12}$ diacrylate as a cross-linking agent 0.2 part by weight when the polymerization conversion rate reached 60%, and additionally adding potassium oleate as the fourth emulsifier 0.35 part by weight when the polymerization conversion rate reached 59% during preparation of diene-based rubber latex to obtain diene-based rubber latex. Further, an acrylonitrile-butadiene-styrene copolymer and a specimen of thermoplastic resin comprising the same were obtained.

Comparative Example 5

The procedure of Example 3 was repeated except for adding 35 mg/L potassium oleate as the fourth emulsifier 0.75 part by weight during preparation of diene-based rubber latex to obtain diene-based rubber latex. Further, an acrylonitrile-butadiene-styrene copolymer and a specimen of thermoplastic resin comprising the same were obtained.

Comparative Example 6

The procedure of Example 3 was repeated except for adding the fourth emulsifier when the polymerization conversion rate reached 45% during preparation of diene-based rubber latex to obtain diene-based rubber latex. Further, an acrylonitrile-butadiene-styrene copolymer and a specimen of thermoplastic resin comprising the same were obtained.

Test Example

Properties such as low-temperature impact strength and gloss of each of the specimens prepared in Examples 1 to 4 and Comparative Examples 1 to 4 were measured, and the results were shown in the following Table 1.

1) Conversion Rate (%): Conversion rate of each of the diene-based rubber latex prepared in Examples 1 to 4 and Comparative Examples 1 to 4 was measured.

2) Impact Strength: Each specimen was prepared in thickness of ¼ inch, and then the impact strength was measured according to ASTM D256.

3) Low-Temperature Impact Strength: The extruded and injected specimen was stored in a low temperature chamber of 20° C. below zero for about 2 hours and then the impact strength was measured according to ASTM D256.

4) Gloss: Gloss was measured at a 45° angle using a gloss meter according to ASTM D-528. In this case, higher gloss value means better gloss.

TABLE 1

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Cross-linking Agent | Number of n | 8 | 8 | 12 | 12 | 12 | — | — | 12 | 12 | 12 | 12 |
| | Content | 0.1 | 0.2 | 0.1 | 0.1 | 0.1 | — | — | 0.5 | 0.2 | 0.1 | 0.1 |
| | Time of Addition (Conversion Rate) | 0% | 0% | 0% | 20% | 0% | — | — | 0% | 60% | 0% | 0% |
| Emulsifier | Kind | | CMC of 35 mg/L Potassium Oleate | | | CMC of 4.8 mg/L C$_{16-18}$ alkenyl dipotassium succinate | — | | CMC of 35 mg/L Potassium Oleate | | | |
| | Content | | 0.35 | | | 0.05 | — | | 0.35 | | 0.75 | 0.35 |
| | Time of Addition (Conversion Rate) | 60% | 58% | 62% | 58% | 60% | — | 62% | 59% | 62% | 42% | |
| | Conversion Rate (%) | 92.7 | 93.1 | 92.8 | 92.7 | 92.8 | 92.5 | 92.8 | 92.1 | 92.5 | 93.8 | 93.5 |
| | Reaction | 19.5 | 20.2 | 19 | 20 | 19.8 | 19 | 20 | 26 | 19.5 | 18.5 | 19 |

TABLE 1-continued

| | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Time (hr) Average Particle Diameter (Å) | 3125 | 3063 | 3082 | 3102 | 3150 | 3112 | 3082 | 3210 | 3105 | 2869 | 2635 |
| Small-sized Particle Diameter (TEM image) | | 30 nm to 70 nm | | | | — | | 30 nm to 70 nm | | | 150 nm to 200 nm |
| Coagulum (%) (Polymerization Stability) | 0.04 | 0.05 | 0.03 | 0.05 | 0.03 | 0.02 | 0.03 | 0.15 | 0.03 | 0.05 | 0.09 |
| Impact Strength (1/4) | 33.9 | 34.2 | 36.1 | 34.9 | 35.8 | 32.1 | 32.1 | 34.2 | 31.9 | 29.5 | 27.2 |
| Gloss (45) | 94.6 | 93.9 | 95.4 | 94.2 | 94.3 | 86.3 | 95.3 | 91.2 | 93.7 | 95.6 | 95.2 |
| Low Temperature Impact Strength (−20° C.) | 12.9 | 13.2 | 13.7 | 13.0 | 13.8 | 11.2 | 13.9 | 12.4 | 11.9 | 10.2 | 8.7 |
| Content ratio (Large-sized: Small-sized) | 99%:1% | 98%:2% | 98%:2% | | 99%:1% | — | 98%:2% | | | 96%:4% | — |

As shown in the above Table 1, according to the method of the present invention, in the cases of the thermoplastic resin specimens of Examples 1 to 5 adding the cross-linking agent at the time point of the polymerization conversion rate of 0% to 20%, and adding the fourth emulsifier at the time point of the polymerization conversion rate of 50% to 80, it can be found that all of the polymerization stability, the impact strength, the gloss and the low-temperature impact strength were improved, compared to the thermoplastic resin specimen of Comparative Example 1 not adding the cross-linking agent and the fourth emulsifier.

Meanwhile, in the case of the thermoplastic resin specimen of Comparative Example 2 not containing the cross-linking agent and adding the fourth emulsifier at the time point of the polymerization conversion rate of 62%, it was confirmed that the gloss and the low-temperature impact strength were improved but the impact strength was low, compared to the thermoplastic resin specimens of Examples 1 to 5. Further, in the case of the thermoplastic resin specimen of Comparative Example 3 adding excess amount of the cross-linking agent, the impact strength was high but the gloss and the low-temperature impact strength were low, compared to the thermoplastic resin specimen of Example 1. Further, in the case of the thermoplastic resin specimen of Comparative Example 4 adding the cross-linking agent at the later time point, the small-sized particles were not found, and it was confirmed that all of the impact strength, the gloss and the low temperature impact strength were low, compared to the thermoplastic resin specimens of Examples 1 to 5.

Further, in the case of the thermoplastic resin specimen of Comparative Example 5 adding the fourth emulsifier in a large amount of 0.75 part by weight, it was confirmed that the reaction time was short and the gloss was high, compared to the thermoplastic resin specimens of Examples 1 to 5, but the impact strength and the low-temperature impact strength were low. In particular, it can be found that diene-based rubber latex content ratio of the large-sized diene-based rubber latex and the small-sized diene-based rubber latex (large-sized diene-based rubber latex:small-sized diene-based rubber latex) contained in the thermoplastic resin specimen of Comparative Example 5 was 96%:4%, i.e., the content ratio of the large-sized diene-based rubber latex was low.

Further, in the case of the thermoplastic resin specimen of Comparative Example 6 adding the fourth emulsifier at the time point of the low polymerization conversion rate of 45%, it can be found that the impact strength and the low-temperature impact strength were certainly reduced, compared to the thermoplastic resin specimens of Examples 1 to 5.

The invention claimed is:
1. A method for preparing diene-based rubber latex comprising:
   an initial step of an entire polymerization reaction comprising adding a conjugated diene-based monomer 60 parts by weight to 75 parts by weight, a first emulsifier 1 part by weight to 3 parts by weight, a polymerization initiator 0.2 part by weight to 0.4 part by weight, an electrolyte 0.2 part by weight to 3 parts by weight, a molecular weight control agent 0.1 part by weight to 0.5 part by weight and ion exchanged water 65 parts by weight to 100 parts by weight into a reactor and then polymerizing thereof;
   a step of adding the conjugated diene-based monomer 10 parts by weight to 20 parts by weight and a second emulsifier 0.1 part by weight to 1.0 part by weight simultaneously at the time point that a polymerization conversion rate of the entire polymerization reaction is 30% to 40% and then polymerizing thereof;
   a step of adding a residual amount of a conjugated diene-based monomer and optionally a third emulsifier 0 part by weight to 1 part by weight simultaneously or continuously at the time point that the polymerization conversion rate of the entire polymerization reaction is 60% to 70% and then polymerizing thereof;
   a step of completing polymerization by adding a polymerization inhibitor at the time point that the polymerization conversion rate of the entire polymerization reaction is 92% or higher,
   which further comprises a step of additionally adding a cross-linking agent 0.05 part by weight to 0.3 part by weight at the time point that the polymerization conversion rate of the entire polymerization reaction is 0% to 50%; and
   which further comprises a step of adding a fourth emulsifier having critical micelle concentration (CMC) of 150 mg/L or less 0.01 part by weight to 0.5 part by weight at the time point that the polymerization conversion rate of the entire polymerization reaction is 50% to 85%.

2. The method for preparing diene-based rubber latex of claim 1, wherein the conjugated diene-based monomer is a single material of a conjugated diene-based monomer, or a monomer mixture comprising the conjugated diene-based monomer as a main ingredient.

3. The method for preparing diene-based rubber latex of claim 2, wherein the conjugated diene-based monomer is a single material selected from the group consisting of 1,3-butadiene, isoprene, chloroprene and piperylene, or a mixture thereof.

4. The method for preparing diene-based rubber latex of claim 1, wherein the monomer mixture comprises:
the conjugated diene-based monomer 55 wt % to 99.7 wt %;
an aromatic vinyl-based monomer 0.1 wt % to 40 wt %; and
a vinyl cyanide-based monomer 0.1 wt % to 40 wt %.

5. The method for preparing diene-based rubber latex of claim 4, wherein the aromatic vinyl-based monomer is at least one selected from the group consisting of styrene, α-methyl styrene, α-ethyl styrene and p-methyl styrene.

6. The method for preparing diene-based rubber latex of claim 4, wherein the vinyl cyanide-based monomer is at least one selected from the group consisting of acrylonitrile, methacrylonitrile and ethacrylonitrile.

7. The method for preparing diene-based rubber latex of claim 1, wherein the first emulsifier, the second emulsifier and the third emulsifier are each independently a single material selected from the group consisting of allyl aryl sulfonate, alkali metal alkyl sulfate, sulfonated alkyl ester, fatty acid soap, rosin acid alkali salt, sodium lauryl sulfonate, potassium oleate, sodium alkylbenzene sulfonate, polyoxyethylene alkylphenyl ether, sodium dodecyl allyl sulfosuccinate, C16-18 alkenyl dipotassium succinate, sodium acrylamido stearate, polyoxyethylene alkyl phenyl ether ammonium sulfate and polyoxyethylene alkyl ether ester ammonium salt, or a mixture thereof.

8. The method for preparing diene-based rubber latex of claim 1, wherein:
the initial step is conducted at a temperature range from 65° C. to 70° C.;
the step of adding the conjugated diene-based monomer and a second emulsifier is conducted at a temperature range from 72° C. to 75° C.; and
the step of adding the residual amount of the conjugated diene-based monomer and optionally the third emulsifier is conducted at a temperature range from 80° C. to 85° C.

9. The method for preparing diene-based rubber latex of claim 1, wherein the cross-linking agent comprises (alkylene glycol)$_n$ diacrylate or (alkylene glycol)$_n$ triacrylate (wherein, n is an integer between 3 and 15).

10. The method for preparing diene-based rubber latex of claim 9, wherein the cross-linking agent is at least one selected from the group consisting of (ethylene glycol)$_8$ diacrylate, (ethylene glycol)$_{12}$ diacrylate, (propylene glycol)$_8$ diacrylate and (propylene glycol)$_{12}$ diacrylate.

11. The method for preparing diene-based rubber latex of claim 1, wherein the fourth emulsifier comprises an emulsifier having CMC of 10 mg/L or less or an emulsifier having CMC of 10 mg/L to 150 mg/L.

12. The method for preparing diene-based rubber latex of claim 11, wherein the emulsifier having CMC of 10 mg/L or less is further added in an amount of 0.01 part by weight to 0.3 part by weight at the time point that the polymerization conversion rate of the entire polymerization reaction is 60% to 85%.

13. The method for preparing diene-based rubber latex of claim 11, wherein the emulsifier having CMC of 10 mg/L or less is C$_{16-18}$ alkenyl dipotassium succinate, polyoxyethylene alkylphenyl ether or polyoxyethylene alkylphenyl ether ammonium sulfate.

14. The method for preparing diene-based rubber latex of claim 11, wherein the fourth emulsifier having CMC of 10 mg/L to 150 mg/L is further added in an amount of 0.05 part by weight to 0.5 part by weight at the time point that the polymerization conversion rate of the entire polymerization reaction is 50% to 85%.

15. The method for preparing diene-based rubber latex of claim 11, wherein the emulsifier having CMC of 10 mg/L to 150 mg/L is fatty acid soap or potassium oleate.

* * * * *